US011920952B1

(12) United States Patent
Panosian et al.

(10) Patent No.: US 11,920,952 B1
(45) Date of Patent: Mar. 5, 2024

(54) LEVEL DEVICE WITH REMOVABLE ENDCAP

(71) Applicants: Michael H Panosian, Irvine, CA (US); Joshua M Keeler, Irvine, CA (US)

(72) Inventors: Michael H Panosian, Irvine, CA (US); Joshua M Keeler, Irvine, CA (US)

( * ) Notice: Subject to any disclaimer, the term of this patent is extended or adjusted under 35 U.S.C. 154(b) by 0 days.

(21) Appl. No.: 17/958,299

(22) Filed: Sep. 30, 2022

(51) Int. Cl.
*G01C 9/02* (2006.01)
*G01C 9/34* (2006.01)

(52) U.S. Cl.
CPC .............. *G01C 9/02* (2013.01); *G01C 9/34* (2013.01)

(58) Field of Classification Search
CPC .................................. G01C 9/02; G01C 9/34
See application file for complete search history.

(56) References Cited

U.S. PATENT DOCUMENTS

| | | | | |
|---|---|---|---|---|
| 5,412,876 A * | 5/1995 | Scheyer | .................... | G01C 9/28 33/379 |
| 7,150,106 B2 * | 12/2006 | Kallabis | .................... | G01C 9/26 33/379 |
| 7,866,055 B2 * | 1/2011 | Zhang | ...................... | G01C 9/26 33/365 |
| 8,925,212 B2 * | 1/2015 | Allemand | ................ | G01C 9/32 33/348.2 |
| 9,909,870 B2 * | 3/2018 | Neitzell | .................... | G01C 9/28 |
| 10,436,584 B2 * | 10/2019 | Gray | ........................ | G01C 9/26 |
| 10,458,791 B2 * | 10/2019 | Guma | ....................... | G01C 9/26 |
| 10,697,770 B2 * | 6/2020 | Neitzell | .................... | G01C 9/34 |
| 10,845,193 B2 * | 11/2020 | Doyle | ....................... | G01C 9/34 |
| 11,085,762 B2 * | 8/2021 | Leidel | ...................... | G01C 9/26 |
| 11,193,763 B1 * | 12/2021 | Panosian | .................. | G01C 9/34 |
| 11,255,667 B1 * | 2/2022 | Panosian | .................. | G01C 9/28 |
| 11,346,664 B2 * | 5/2022 | Neitzell | .................... | G01C 9/28 |
| 11,441,898 B2 * | 9/2022 | Doyle | ....................... | G01C 9/34 |
| 2005/0223577 A1 * | 10/2005 | Scarborough | ............ | G01C 9/28 248/467 |
| 2010/0000105 A1 * | 1/2010 | Zhang | ...................... | G01C 9/28 33/365 |
| 2016/0138918 A1 * | 5/2016 | Neitzell | .................... | G01C 9/28 29/525.01 |
| 2021/0048295 A1 * | 2/2021 | Doyle | ...................... | G01C 9/02 |

* cited by examiner

*Primary Examiner* — John Fitzgerald
*Assistant Examiner* — Tania Courson
(74) *Attorney, Agent, or Firm* — Farjam Majd; ARJOMAND LAW GROUP

(57) ABSTRACT

A removeable level endcap is disclosed where the endcap safeguards the end of the level apparatus against drops and impacts. The endcap assembly includes a sliding C-clamp slidably housed inside a locking hook structure. Both locking and locking hook structures are "C" shaped with two end portions coupled to a middle portion. With the sliding C-clamp in a fully pushed backward position within the locking hook housing structure, a single linear forward push of the sliding C-clamp couples the locking hook structure end portions with the level end and locks the endcap onto the level end using locking tabs on locking hook structure end portions with the sliding C-clamp in a pushed fully forward position within the locking hook structure. Unlocking, detaching, and removing the endcap from the level apparatus is accomplished with a single linear backward pull of the sliding C-clamp within the locking hook structure.

20 Claims, 9 Drawing Sheets

LEVEL DEVICE WITH REMOVABLE ENDCAP

TECHNICAL FIELD

This application relates generally to a level device used to measure orientation of a surface. More specifically, this application relates to a method and apparatus to use an endcap on a level to protect ends of the level against falls.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
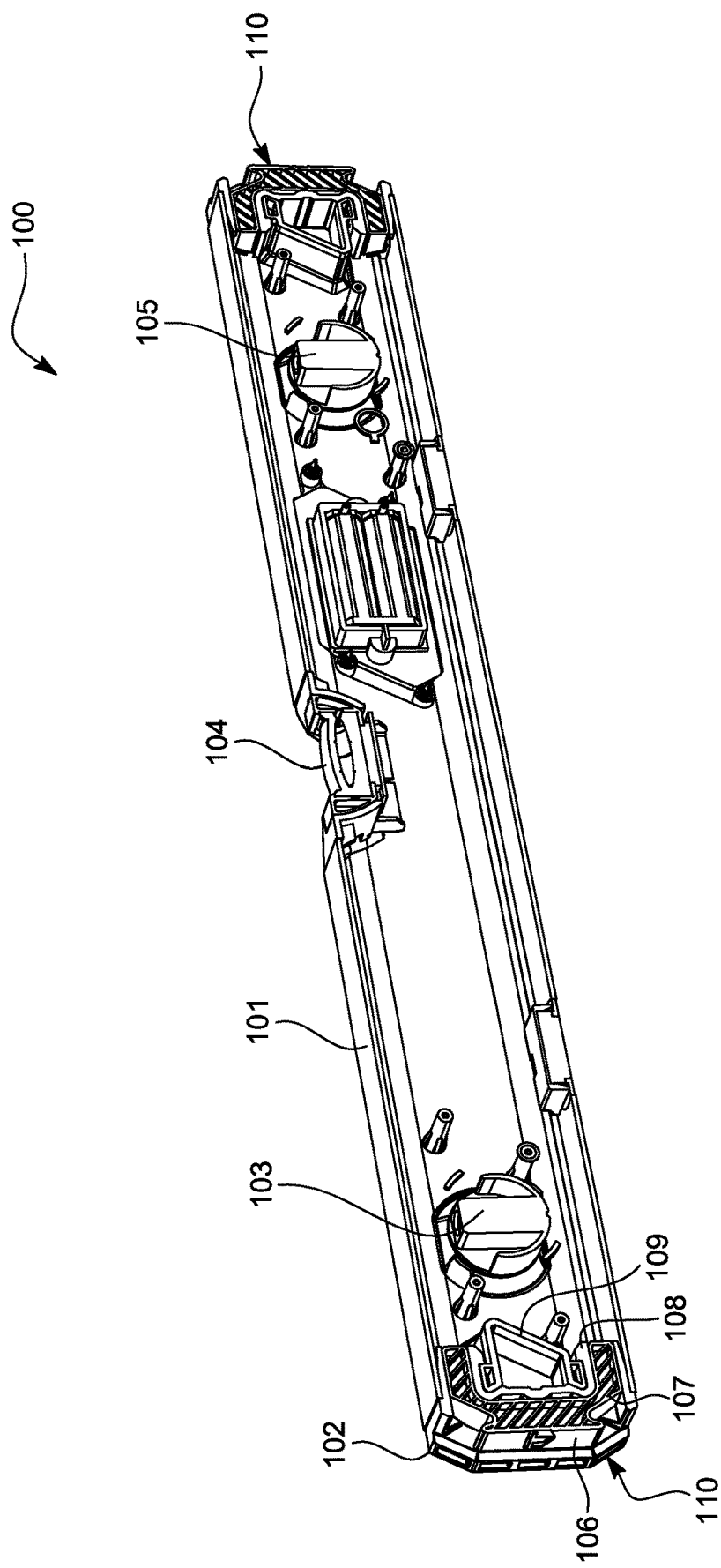
FIG. 1 shows an example level apparatus used to measure orientation of a work surface with endcaps coupled and locked to the end of the level apparatus.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references an endcap to be coupled to an end of a level apparatus, it will be appreciated that the disclosure may be used with any kind of orientation measuring apparatus, length measuring apparatus or other tools that needs protection against drops or other impact.

Briefly described, a method and apparatus are disclosed detailing an endcap assembly that is coupled to the end of a level apparatus to protect ends of the level apparatus against falls and drops. The disclosure includes a removable endcap assembly in a level device used to measure orientation of a work surface. In some applications the level body may be set flush against a corner wall or surface to measure orientation or to scribe a straight line from end to end of the level apparatus. In these cases, the endcap is removed from the level end. The endcap removal and replacement is simple and reliable. When installed, the endcap may be locked in place onto the end of the level apparatus so it does not dislodge from the level apparatus in normal use or inadvertently remains in the work area as a foreign object debris. When installed, the endcap does not rattle or come loose by itself, and may be positively locked onto the level body. The present disclosure describes all of the above considerations, and furthermore the disclosed endcap may be coupled and locked onto the level end with a single straight forward forced movement (push into the level apparatus) of the endcap against the level end, and it can be unlocked, dislodged, and removed from the level end with a single backward movement (pull away from the level apparatus) of the endcap.

The easy attachment and detachment feature of the endcap is accomplished through the providing of a two-parts endcap assembly where a sliding C-clamp is slidably housed within a locking hook open frame structure. Throughout this disclosure "locking hook open frame structure" and "locking hook structure" are used interchangeably. The locking hook open frame structure, using a locking tab, couples to the level end, and the sliding C-clamps, capable of sliding within the locking hook structure open frame, slides forward within the locking hook structure to lock in the locking hook structure locking tab in the level end. Furthermore, the sliding C-clamp may unlock and dislodge the locking hook structure locking tab from the level end by being pulled backwards (away from the level apparatus) within the locking hook open frame structure resulting in separation of the endcap from the level end. Features of the two-parts endcap are detailed in the following embodiments.

In various embodiments of present disclosure, a level endcap includes an endcap assembly, further including a locking hook structure and a sliding C-clamp, is removably coupled and locked to an end of a level apparatus. In this assembly, the sliding C-clamp located slidably inside the locking hook structure can unlock and separate the endcap from the level apparatus through a single sliding movement, where the single sliding movement is a straight linear movement.

In various embodiments of present disclosure, a two-parts endcap includes a "C" shaped locking hook housing open frame structure and a "C" shaped sliding C-clamp, where the "C" shape configuration provides two end portions coupled to a middle portion for each one of the locking hook structure and the sliding C-clamp. In some embodiments, the end portions of the C-shaped structures are each attached to the middle portion at an angle, for example 90 degrees, while in other embodiments, the attachment angle may be more or less than perpendicular. Is some embodiments, the end portions may be of equal length, while in other embodiments, the end portions may be unequal in length. The end portions of the sliding C-clamp are slidably positioned inside the locking hook structure and move linearly within the end portions of the locking hook structure flexing the end portions of the locking hook structure substantially perpendicular to the linear movement direction of the sliding C-clamp.

In various embodiments of the present disclosure, a method of using a level apparatus endcap includes using an endcap assembly comprising a "C" shaped sliding C-clamp with two end portions coupled to a middle portion, slidably housed in a "C" shaped locking hook housing open frame structure with two end portions coupled to a middle portion. The endcap assembly includes the sliding C-clamp in a pushed backward position within the locking hook housing open frame structure, causing the end portions of the locking hook structure angularly pushed away from each other from a parallel configuration. Upon coupling of the endcap assembly locking hook structure to the level end of a level apparatus, sliding the sliding C-clamp forward inside the locking hook structure relaxes the end portions of the locking hook structure into a substantially parallel angular configuration, further pushing on the ends of the locking hook structure end portions, pushing on the locking tabs, locking coupling the endcap assembly to the level end using the locking tab on an inner side wall of the end portions of the locking hook structure.

It is common practice to have measurement tools precision machined with sharp edges to enable precision measurement. As an example, calipers, precision rulers, protractors, and levels have sharp edges at the end or along a length of the tool. Such sharp edges are prone to be damaged by impact or upon dropping on a hard surface. To safeguard edges of measurement tools it is common to cover them with a soft cap or keep the instrument in a box when the tool is not in use. Keeping the tool in a box most of the time is cumbersome and operators using the tools usually prefer not to box and unbox their tool repeatedly if they do not have to do so. Using soft caps, such as soft rubber or plastics like neoprene, on edges of the measurement tools may not be very practical because in time the caps may become loose and not stay on the measurement tools and get lost leaving the tools vulnerable to damage due to drops or impact. Present disclosure describes a lockable endcap that is easily coupled to an end of a level apparatus, is securely held in place, does not become loose, is removeable from the level apparatus when operator of the level apparatus needs to use sharp edges of the level apparatus for a particular application, and accordingly the disclosed endcap does not fall off of the level end and does not get lost.

As to the presented figures, FIG. 1 shows an example level apparatus used to measure orientation of a work surface with endcaps coupled and locked to the end of the level apparatus. A level apparatus configuration 100 with locked endcaps is shown with the level apparatus 101 illustrated showing multiple bubble vials 103, 104, 105, an endcap assembly 110 including a handle 106, a sliding C-clamp 107, a locking hook structure 108, a locking hook structure outer wall 102, with the locking hook structure 108 coupled and locked to a level end 109.

A sample level apparatus is illustrated which is used to measure orientation of a work surface and at times used to scribe a straight line on the work surface. Level apparatus 101 uses an endcap assembly 110 to safeguard the end of the level apparatus against drops and impacts, however other styles of level apparatus or straight edge tools with similar endcaps may be used in construction where using an endcap assembly 110 will safeguard the level apparatus or straight edge tool ends from drops and impacts.

With continued reference to FIG. 1, the endcap assembly 110 may have two parts including a sliding C-clamp 107 coupled inside the locking hook structure 108. FIG. 1 further illustrates a handle 106 as part of the back of the sliding C-clamp 107. Handle 106 is used to pull and/or push the sliding C-clamp 107 within the locking hook structure 108. Handle 106 is also used to pull and/or push the endcap assembly 110 with the sliding C-clamp 107 and locking hook structure 108 assembled into the endcap assembly 110. The illustrated endcap assembly 110 is shown with the sliding C-clamp 107 in a fully forward position within the locking hook structure 108, showing the endcap assembly 110 as coupled to the level end 109 in a locking configuration where the locking hook structure 108 as part of the endcap assembly 110 is coupled and locked to the level end 109. Elements such as locking hook structure outer wall 102 and handle 106 and other detailed specifications of the sliding C-clamp 107 and locking hook structure 108 are further detailed in follow-on figures' descriptions.

Figure 2:
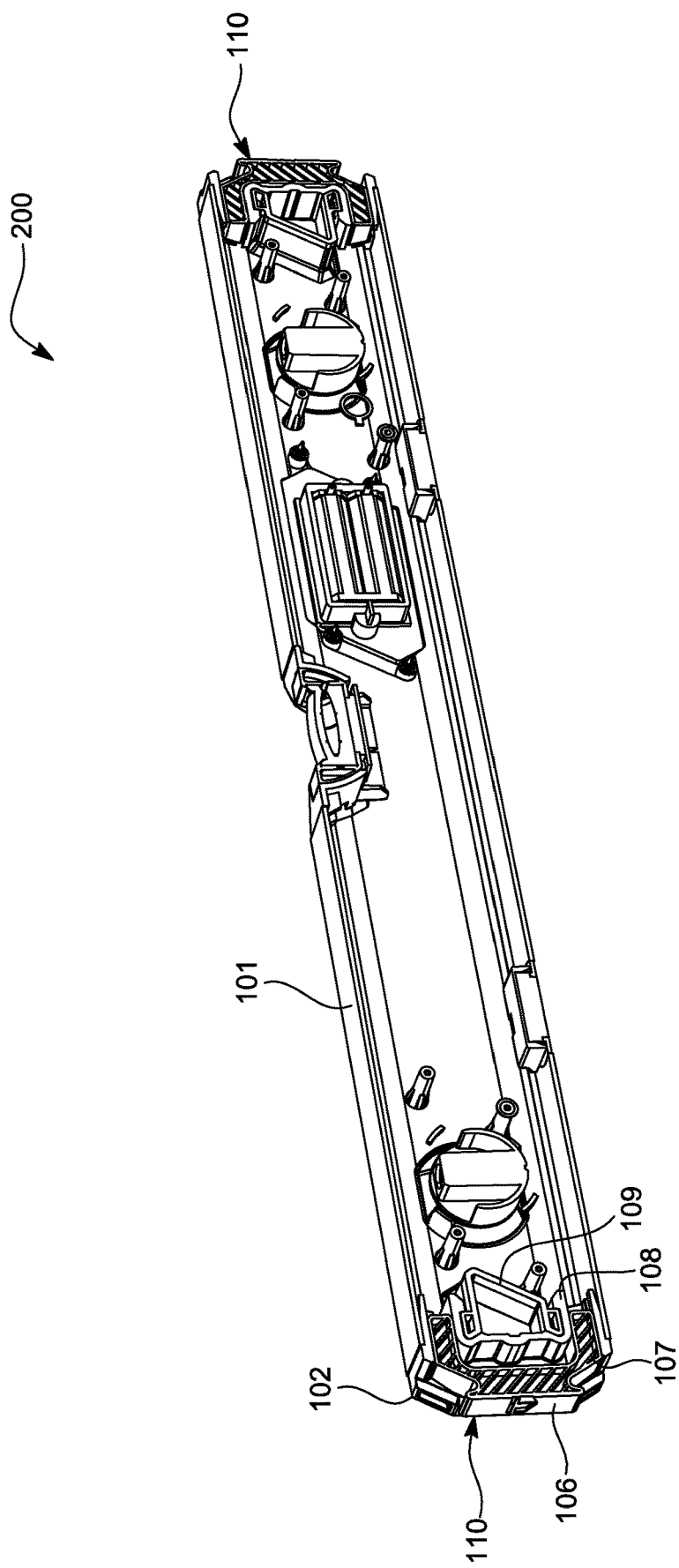
FIG. 2 shows the example level apparatus of FIG. 1 with endcaps coupled but not locked to the end of the level apparatus.

FIG. 2 shows the example level apparatus of FIG. 1 with endcaps coupled but not locked to the end of the level apparatus. FIG. 2 shows the general configuration 200 of the level apparatus with inserted endcaps on both sides of the level apparatus 101. Elements of locking hook structure outer wall 102, endcap assembly 110, handle 106, sliding C-clamp 107, locking hook structure 108 and level end 109 are also identified in the illustration.

FIG. 2 shows, at one end of the level apparatus 101, the sliding C-clamp 107 in a fully backward configuration inside the locking hook structure 108 where the endcap assembly 110 is coupled with the level end 109 via the locking hook structure 108 in an unlocked configuration. The unlocked configuration of the endcap assembly 110 with the sliding C-clamp 107 in a fully backward position within the locking hook structure 108 is the stage at which the endcap assembly 110 may be coupled to the level end 109 or may be dislodged from the level end 109. In the configuration illustrated here pushing forward on the handle 106 towards the level end 109 will slide the sliding C-clamp 107 inside the locking hook structure 108 forward towards the level end 109 initiating the locking of the locking hook structure 108 onto the level end 109, alternatively pulling of the handle 106 backward away from level end 109 will pull the sliding C-clamp 107 and coupled locking hook structure 108 forming the endcap assembly 110 away from the level end 109 and will dislodge locking hook structure 108 and corresponding endcap assembly 110 from the level end 109 and separate the endcap assembly 110 from the level apparatus 101.

At the other end of level apparatus 101 a coupled and locked endcap assembly 110 is shown with the sliding C-clamp 107 at a fully forward configuration within the locking hook structure 108 locking the locking hook structure 108 and corresponding endcap assembly 110 to the level end 109 of the level apparatus 101.

Figure 3:
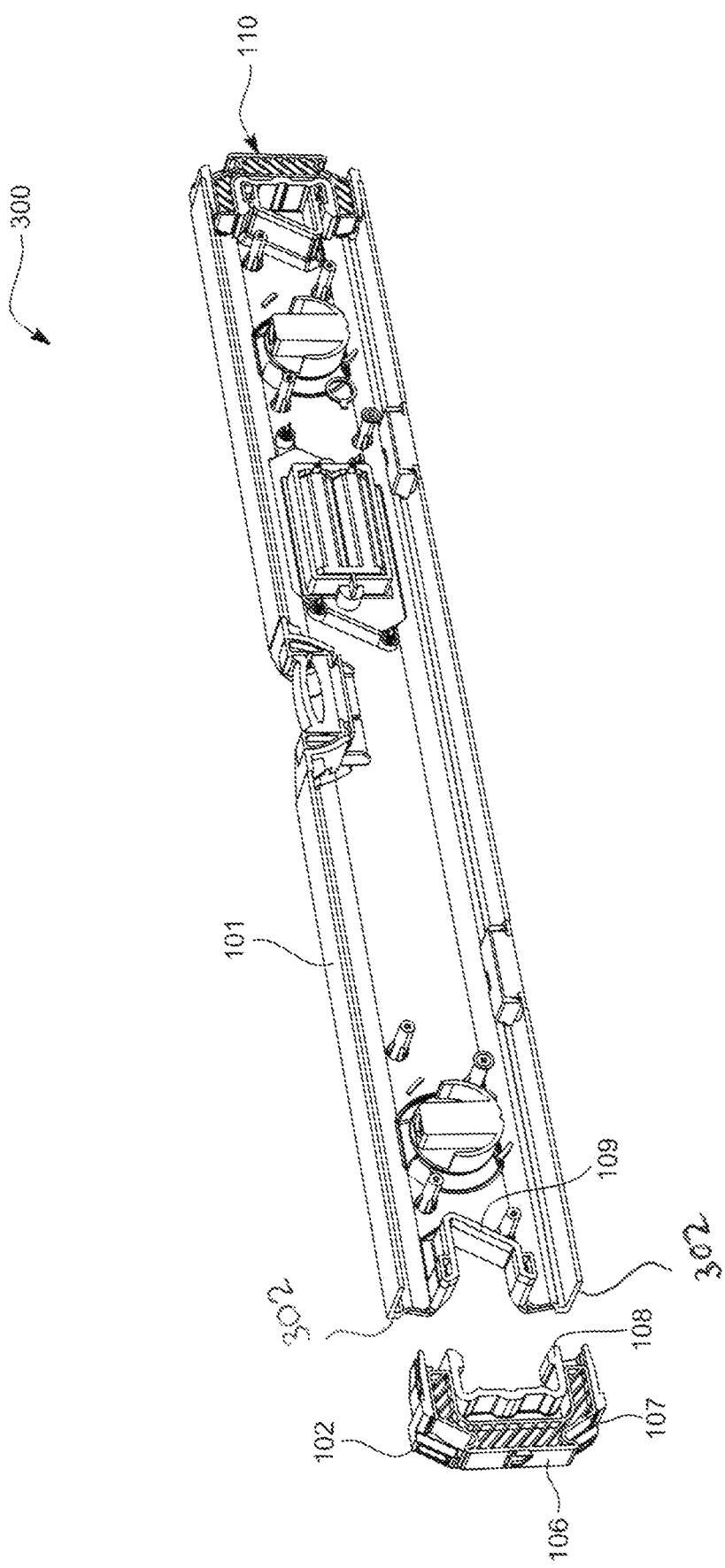
FIG. 3 shows the example level apparatus of FIG. 1 with an endcap uncoupled from the end of the level apparatus.

FIG. 3 shows the example level apparatus of FIG. 1 with an endcap uncoupled from the end of the level apparatus. FIG. 3 shows a level apparatus configuration 300 with a separated end cap. This figure further identifies a level apparatus 101 with a level end 109 and level end edges 302, endcap assembly 110 and associated locking hook structure outer wall 102, handle 106, sliding C-clamp 107, and locking hook structure 108.

FIG. 3 illustrates a separated endcap 110 from the level apparatus 101 at one end of the level apparatus 101, where the sliding C-clamp 107 within the locking hook structure 108 is at a fully backward configuration. At the other end of level apparatus 101 a coupled and locked endcap assembly 110 is shown with the sliding C-clamp 107 at a fully forward configuration within the locking hook structure 108 locking the locking hook structure 108 and corresponding endcap assembly 110 to the level end 109 of the level apparatus 101.

Figure 4:
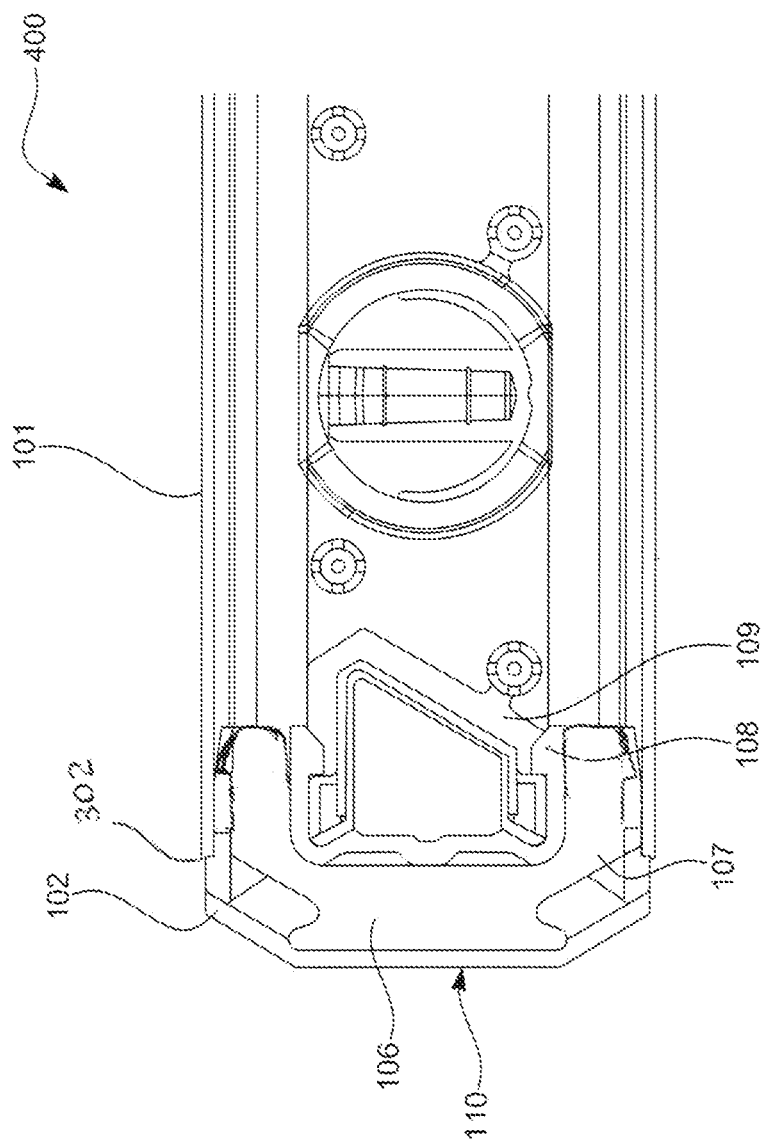
FIG. 4 shows a closeup of an example level apparatus with an endcap coupled and locked to the end of the level apparatus.

FIG. 4 shows a closeup of an example level apparatus with an endcap coupled and locked to the end of the level apparatus. Illustration details an enlarged image of a level apparatus with locked endcap 400, a level apparatus 101 with a level end 109 and level end edges 302, endcap assembly 110 and associated locking hook structure outer wall 102, handle 106, sliding C-clamp 107, and locking hook structure 108.

Illustration shows the endcap assembly 110 with the two parts including a sliding C-clamp 107 coupled inside the locking hook structure 108. FIG. 4 further illustrates a handle 106 as part of the back of the sliding C-clamp 107. Handle 106 is used to pull and/or push the sliding C-clamp 107 within the locking hook structure 108. Handle 106 is also used to pull and/or push the endcap assembly 110 with the sliding C-clamp 107 and locking hook structure 108 assembled into the endcap assembly 110. The illustrated endcap assembly 110 is shown with the sliding C-clamp 107 in a fully forward position within the locking hook structure 108, showing the endcap assembly 110 as coupled to the level end 109 in a locking configuration where the locking hook structure 108 as part of the endcap assembly 110 is coupled and locked to the level end 109.

Figure 5:
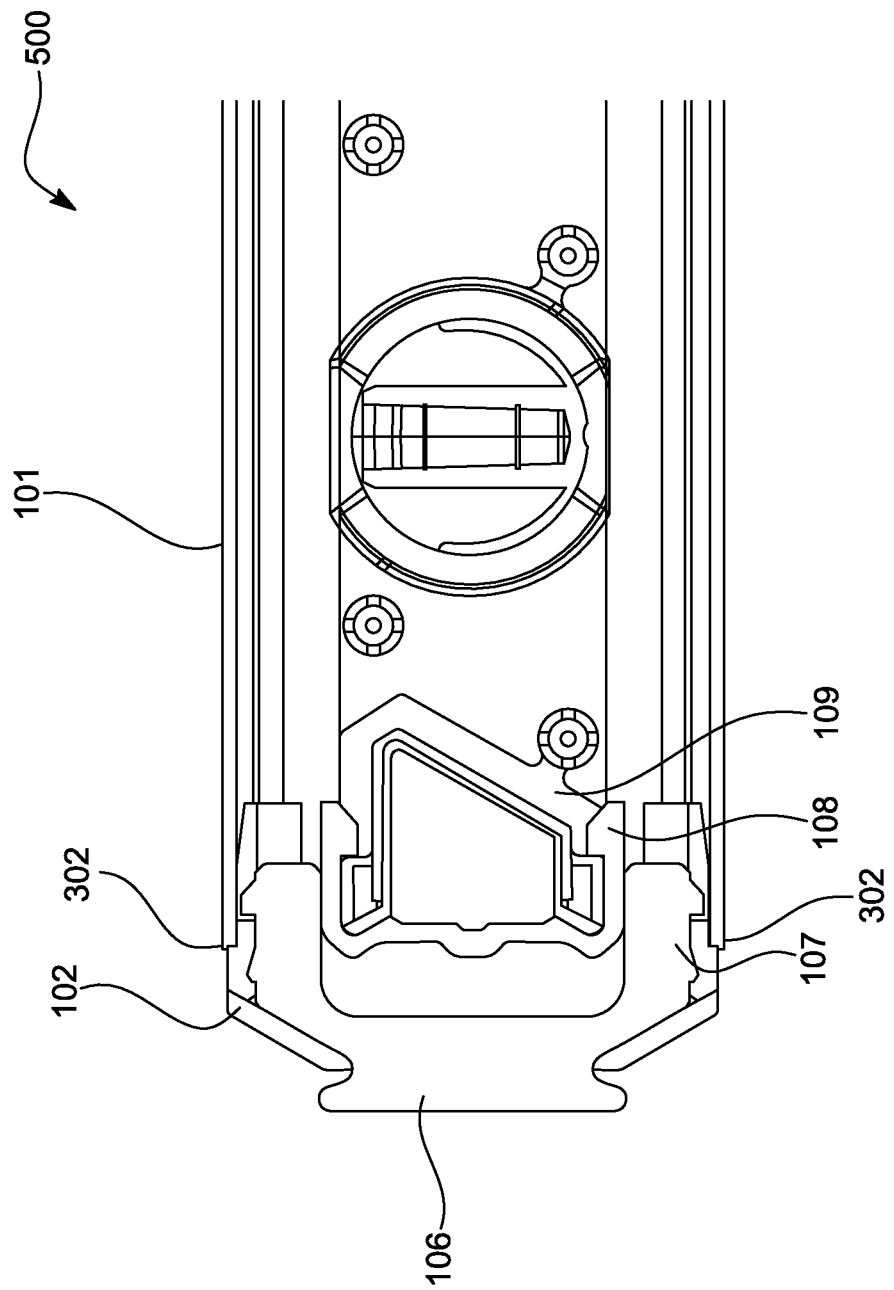
FIG. 5 shows a closeup of the example level apparatus of FIG. 4 with an endcap coupled but not locked to the end of the level apparatus.

FIG. 5 shows a closeup of the example level apparatus of FIG. 4 with an endcap coupled but not locked to the end of the level apparatus. Illustration details an enlarged image of a level apparatus with an inserted endcap 500, additionally elements of locking hook structure outer wall 102, endcap assembly 110, handle 106, sliding C-clamp 107, locking hook structure 108, level end edges 302 and level end 109 are also identified in the illustration.

FIG. 5 shows the sliding C-clamp 107 in a fully backward configuration inside the locking hook structure 108 where the endcap assembly 110 is coupled with the level end 109 via the locking hook structure 108 in an unlocked configuration. The unlocked configuration of the endcap assembly 110 with the sliding C-clamp 107 in a fully backward position within the locking hook structure 108 is the stage at which the endcap assembly 110 may be coupled to the level end 109 or may be dislodged from the level end 109. In the configuration illustrated here pushing forward on the handle 106 towards the level end 109 will slide the sliding C-clamp 107 inside the locking hook structure 108 forward initiating the locking of the locking hook structure 108 onto the level end 109, alternatively pulling of the handle 106 backward away from the level end 109 will pull the sliding C-clamp 107 and coupled locking hook structure 108 forming the endcap assembly 110 away from the level end 109 and will dislodge locking hook structure 108 and corresponding endcap assembly 110 from the level end 109 and separate the endcap assembly 110 from the level apparatus 101.

Figure 6:
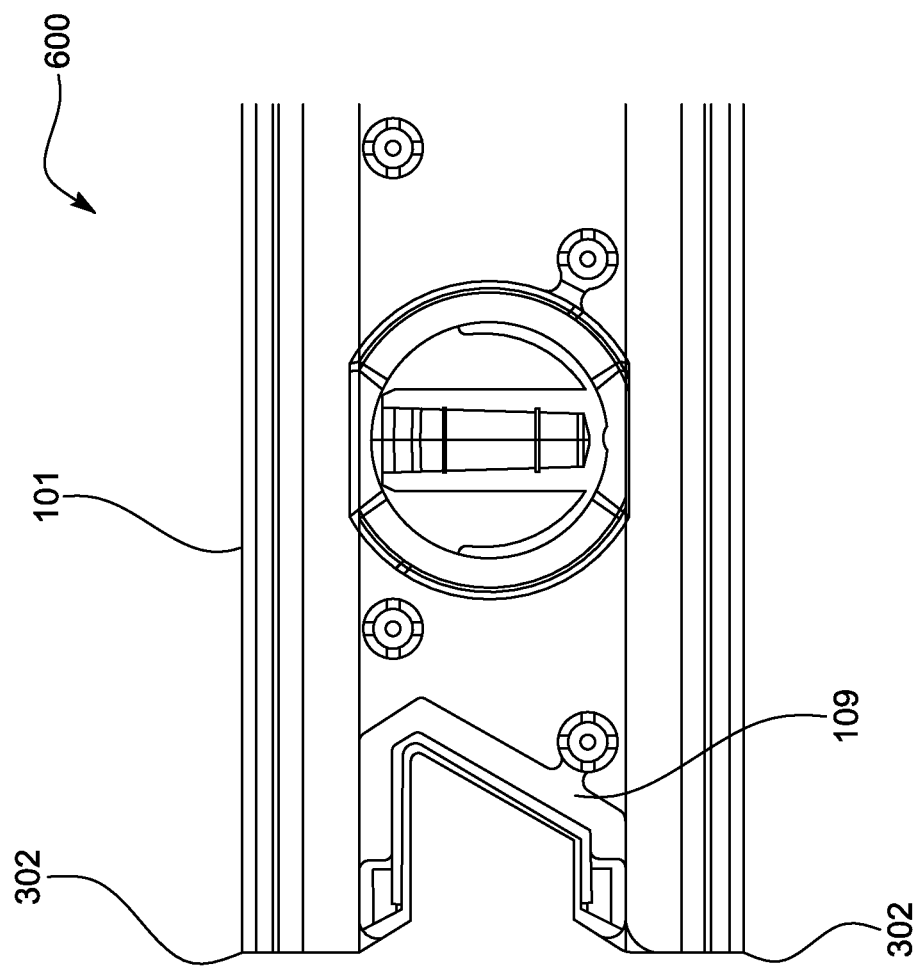
FIG. 6 shows a closeup of the example level apparatus of FIG. 4 with an endcap uncoupled from the end of the level apparatus.
Figure 6:
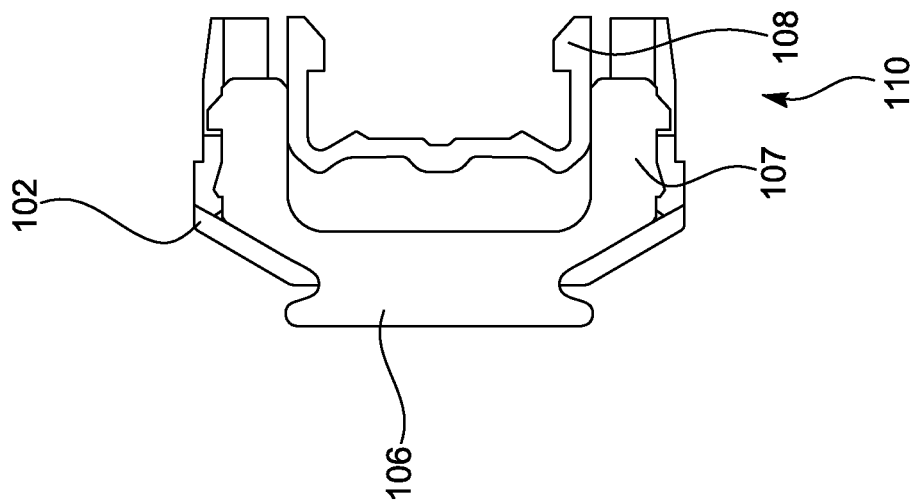

FIG. 6 shows a closeup of the example level apparatus of FIG. 4 with an endcap uncoupled from the end of the level apparatus. Illustration details an enlarged image of a level apparatus with a separated endcap 600. This figure further identifies a level apparatus 101 with a level end 109 and level end edges 302, endcap assembly 110 and associated locking hook structure outer wall 102, handle 106, sliding C-clamp 107, and locking hook structure 108.

FIG. 6 illustrates a separated endcap 110 from the level apparatus 101, where the sliding C-clamp 107 within the locking hook structure 108 is at a fully backward configuration. The illustrated endcap assembly 110 at this stage is ready to be coupled with the level apparatus 101 at the level end 109. When the handle 106 of the sliding C-clamp 107 is pushed forward towards the level end 109, the forward force moves the endcap assembly 110 towards the level apparatus 101. Once the locking hook structure 108 of the endcap assembly 110 reaches the level end 109 then the locking hook structure 108 couples with the level end 109 and does not move forward anymore. A continued push forward on the handle 106 will cause the sliding C-clamp 107 to slide forward within the locking hook structure 108 causing the locking hook structure 108 to lock to the level end 109. The locking mechanism is further detailed in explanation of follow-on figures.

Figure 7:
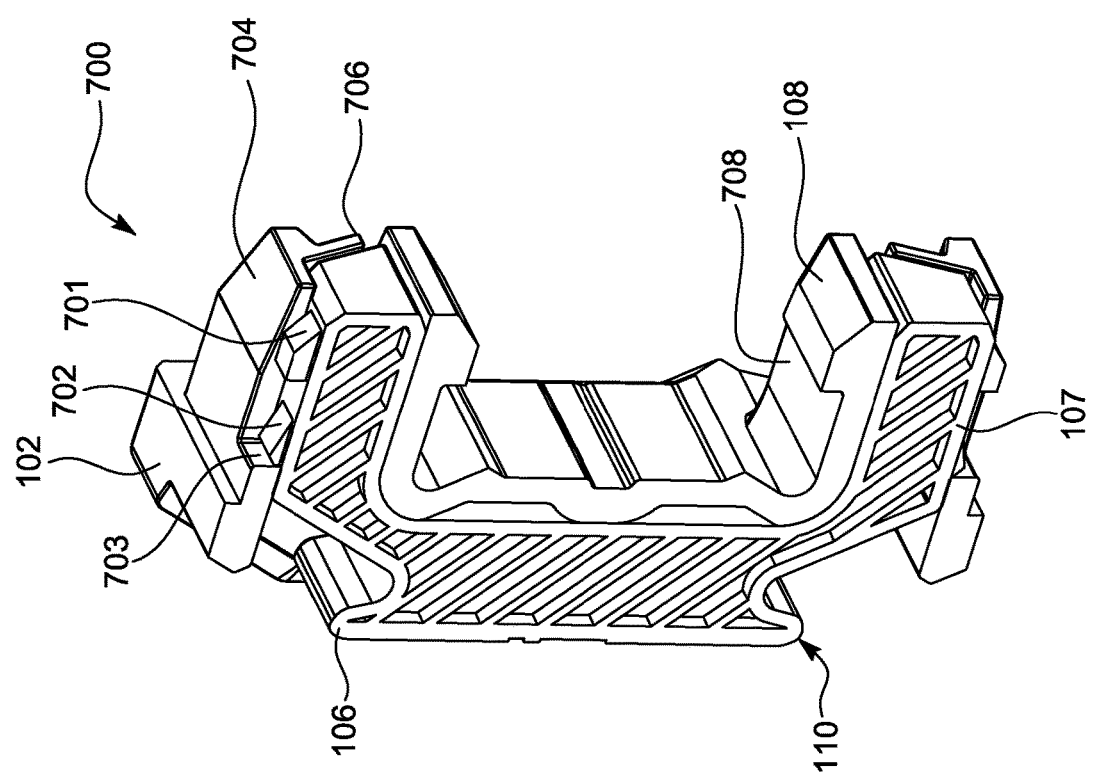
FIG. 7 shows an example of a Level endcap assembly in a locked configuration.

FIG. 7 shows an example of a Level endcap assembly in a locked configuration. Illustration details a locked endcap assembly 700. FIG. 7 further shows an endcap assembly 110, a sliding C-clamp 107, a locking hook structure 108, a locking hook structure inner side wall 708, a locking hook structure back wall outer surface 706, a locking hook structure upper outer side wall 704, a sliding C-clamp 107 stop tab 701, a sliding C-clamp 107 positioning tab 702, a locking hook structure 108 outer wall 102, a locking hook structure 108 stop wall 703, and a sliding C-clamp 107 handle 106.

Illustration shows the sliding C-clamp 107 housed within the locking hook structure 108 in a fully forward position. The sliding C-clamp 107 has a "C" shape with two end portions coupled to a middle portion and the locking hook structure 108 has a "C" shape with two end portions coupled to a middle portion. The locking hook structure 108 forms an open frame where the end portions of the open frame have an inner side wall 708, an upper outer side wall 704, and a back wall outer surface 706. The locking hook structure 108 upper outer side wall 704 of the end portion wall has a cut-out that provides a substantially vertical surface as a stop wall 703, which is substantially parallel with the middle portion of the locking hook structure 108. The sliding C-clamp 107 on the outer sides of its end portions have a stop tab 701 and a positioning tab 702. The positioning tab 702 is positioned towards the sliding C-clamp 107 middle portion and the stop tab 701 is positioned towards the free end of the end portions of the sliding C-clamp 107. A handle 106 is formed on the back of the sliding C-clamp 107 middle portion. The sliding C-clamp 107 slides within the locking hook structure 108 open frame with the end portions of the sliding C-clamp 107 sliding within the end portion open frames of the locking hook structure 108.

With the sliding C-clamp 107 in a fully forward position within the locking hook structure 108 the positioning tab 702 is not positioned under the locking hook structure 108 upper outer side wall 102 and the end portion of the sliding C-clamp 107 is on top of locking hook structure 108 end portion inner side wall 708 enabling the locking hook structure to maintain a locking position when the endcap assembly 110 is coupled to the level end 109.

Providing a more detailed description of the illustration, the locking hook structure 108 forms an open frame channel structure shaped in a "C" configuration. The "C" configuration channel structure has two end portions, where each end portion has an inner side wall 708, an outer side wall 704, and a back wall, and where the end portions are coupled to ends of a middle portion with one inner side wall and a back wall. The outer side wall 704 of each of the end portions has a cut out forming a stop wall 703, and the inner side wall 708 of each end portion has a locking tab to couple to a level end 109. The back wall is not coupled to or a part of inner end portion wall 708 allowing vertical movement of the inner side wall 708 movement further allowing vertical movement of locking tab when locking coupling or decoupling of the locking tab to/from the level end 109.

The sliding C-clamp 107 is a solid structure formed in a "C" configuration with two end portions coupled to a middle portion, where an outer side of the middle portion forms a handle 106. The sliding C-clamp 107 is slidably positioned inside the locking hook structure 108 open frame channel with the end portions of the sliding C-clamp 107 slidably moving through the end portion open frame channels of the locking hook structure 108 and where the middle portion of the sliding C-clamp 107 slides against the back wall of the locking hook structure 108 middle portion.

The end portions of the sliding C-clamp 107 have a stop tab 701 and a positioning tab 702 coupled to an outer side of the end portions, with the positioning tab 702 closer to the middle portion of the sliding C-clamp 107 and the stop tab 701 closer to a free end of the end portion.

Figure 8:
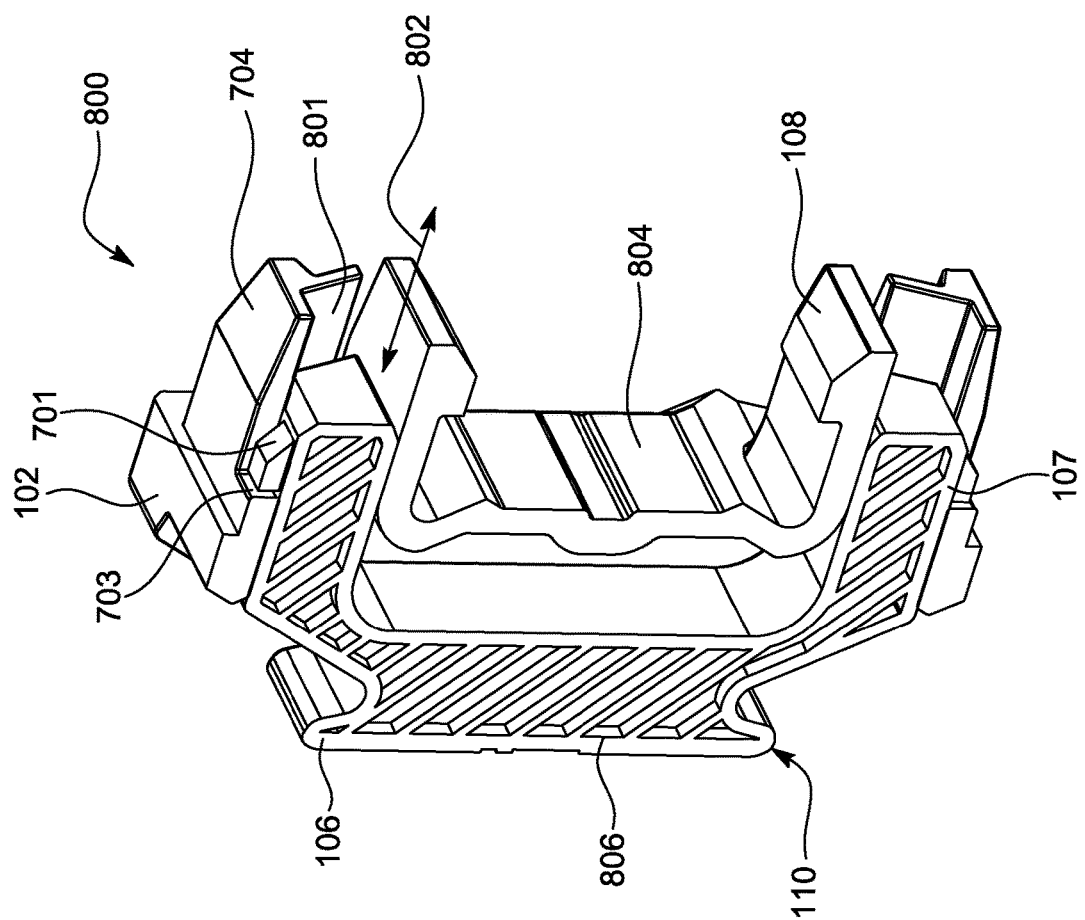
FIG. 8 shows an example of a level endcap assembly in an unlocked configuration.

FIG. 8 shows an example of a level endcap assembly in an unlocked configuration. Illustration details the unlocked endcap assembly 800. Illustration further details the endcap assembly 110, the sliding C-clamp 107, the locking hook structure 108, a front end 804 of the endcap assembly 110, a rear end 806 of the endcap assembly 110, a sliding C-clamp movement direction 802 of the sliding C-clamp 107 within the locking hook structure 108, a locking hook structure 108 back wall inner surface 801, the locking hook structure 108 upper outer side wall 704, the sliding C-clamp 107 stop tab 701, the locking hook structure 108 stop wall 703, the locking hook structure 108 outer wall 102, and the handle 106.

FIG. 8 illustrates the sliding C-clamp 107 in a fully backward position with the positioning tab 702 (not shown) of the sliding C-clamp 107 under the locking hook structure 108 outer wall 102. In this configuration the stop tab 701 rests against the stop wall 703 and does not allow any further backward sliding movement of the sliding C-clamp 107 through the locking hook structure 108. In this configuration the positioning tab 702 pushes the outer wall 102 and the corresponding end portions of the locking hook structure move away from each other in an angular non-parallel direction to disengage the locking tabs of the locking hook structure 108 that were coupled to the level end 109 or gets the locking tabs ready to engage the level end 109 for the endcap to couple and lock onto the level end 109 (not shown). Furthermore, with the sliding C-clamp 107 in a fully backward position the front free edge of the sliding C-clamp 107 end portion is not on top of the locking hook structure 108 end portion wall 708 and the locking tab of the locking hook structure 108 can move vertically up and down perpendicular to the sliding C-clamp 107 back and forth movement direction 802.

Providing a more detail description of the illustration, the pushed backward configuration of sliding C-clamp 107 within locking hook structure 108 with the end of the sliding C-clamp 107 end portion ends not on top of the end of the locking hook structure 108 inner end portion wall 708, further does not impede vertical movement of locking tabs of the locking hook structure 108 end portions allowing vertical movement of the locking tabs to engage and couple to the level end 109 to further lock in place the locking hook structure 108 to the level end 109.

As for a method of using the level endcap, to remove the endcap assembly 110 from the level, the end cap is unlocked from the level end 109 by sliding the sliding C-clamp 107 backward within the locking hook structure 108 flexing the locking hook structure 108 end portions away from each other from an angular parallel configuration and allowing vertical movement of the inner end portion walls 708 of the end portions of the locking hook structure 108, releasing the locking tabs of the locking hook structure from the level end 109. Further pulling back the sliding C-clamp 107, which is positioned within the locking hook structure 108 will move the endcap assembly 110 away from the level end 109.

As for the method of using the level endcap, assembling the endcap includes slidably positioning the sliding C-clamp 107 within the locking hook housing open frame structure 108. Here the locking hook housing open frame structure 108 end portions include an inner side wall 708, an outer side wall 704, and a back wall 801, with the outer side walls 704 further comprising a cutout providing a stop wall 703, and with the middle portion comprising an inner side wall and a back wall.

Here The back wall 801 is not coupled to or a part of inner end portion wall 708 allowing vertical movement of the inner side wall 708 movement further allowing vertical movement of locking tab when locking coupling or decoupling of the locking tab to/from the level end 109.

As for the method of using the level endcap, the "C" shaped sliding C-clamp 107 end portions include a stop tab 701 and a positioning tab 702 on an outer side of the end portions. Furthermore, the end portions of the sliding C-clamp 107 slide within the end portions of the locking hook housing open frame structure 108, and the middle portion of the sliding C-clamp 107 slides against the middle portion back wall of the locking hook housing open frame structure 108.

As for the method of using the level endcap, positioning the sliding C-clamp 107 in a fully forward position within the locking hook housing open frame structure 108 provides the angular parallel positioning of the locking hook housing open frame structure 108 end portions, and with the sliding C-clamp 107 in a fully backward position within the locking hook housing open frame structure 108, positioning the positioning tab 702 of the sliding C-clamp 107 under the outer side wall 102 of the locking hook housing open frame structure 108 pushes the locking hook housing open frame structure 108 end portions away from each other in an angular non-parallel configuration with the sliding C-clamp 107 stop tab 701 resting against the stop wall 703 of the locking hook housing open frame structure 108 end portion upper outer side wall 704 cut out.

As for the method of using the level endcap, a handle 106 formed from a back of the sliding C-clamp 107 middle portion is used to push the sliding C-clamp 107 to slide forward within the locking hook housing open frame structure 108, the handle 106 is also used to pull backward the sliding C-clamp 107 to slide the sliding C-clamp 107 backward within the locking hook housing open frame structure 108. This backward pull of the handle 106, with the sliding C-clamp 107 stop tab 701 against the stop wall 703 of the locking hook housing open frame structure 108 end portion upper outer side wall 704 cut out in a fully backward position, causes the endcap assembly 110 to be pulled back with further pulling backward of the sliding C-clamp 107 middle portion handle 106.

As for the method of using the level endcap, the pulling of the sliding C-clamp 107 middle portion handle 106 and backward sliding of the sliding C-clamp 107 within the locking hook housing open frame structure 108, disengages the locking tab on the inner side wall of the end portions of the locking hook open frame structure 108 from the level apparatus 101. Further pulling backward of the sliding C-clamp 107 middle portion handle 106 from the fully backward position of the sliding C-clamp 107 within the locking hook housing open frame structure 108 causes the endcap assembly 110 moving backward away from the level apparatus 101. Here the backward movement of the sliding C-clamp 107 middle portion handle 106 is a single linear movement causing disengagement of the locked locking hook structure from the level apparatus 101 and separating the endcap 110 from the level apparatus 101.

As for the method of using the level endcap, the locking of the endcap onto the level apparatus 101, with the end cap sliding C-clamp 107 in a fully backward position within the locking hook housing frame structure, starts with a single forward movement of the endcap 110 against an end of the level apparatus, where further pushing the endcap against the level apparatus 101, causes the locking hook housing open frame structure 108 end portions locking tabs to engage the level end 109, coupling the endcap to the level end 109 in a locking manner. The task of removing the endcap 110 from the level end 109 includes a single backward movement of the endcap 110 from the end of the level apparatus 101 by pulling the sliding C-clamp 107 middle portion handle 106 away from the level apparatus 101 until the sliding C-clamp 107 end portion stop tab 701 reaches and rests against the stop wall 703 of the locking hook structure 108 open frame end portion, where continued backward pull disengages the endcap from the level apparatus 101 and removes the endcap 110 from the level end 109.

Figure 9:
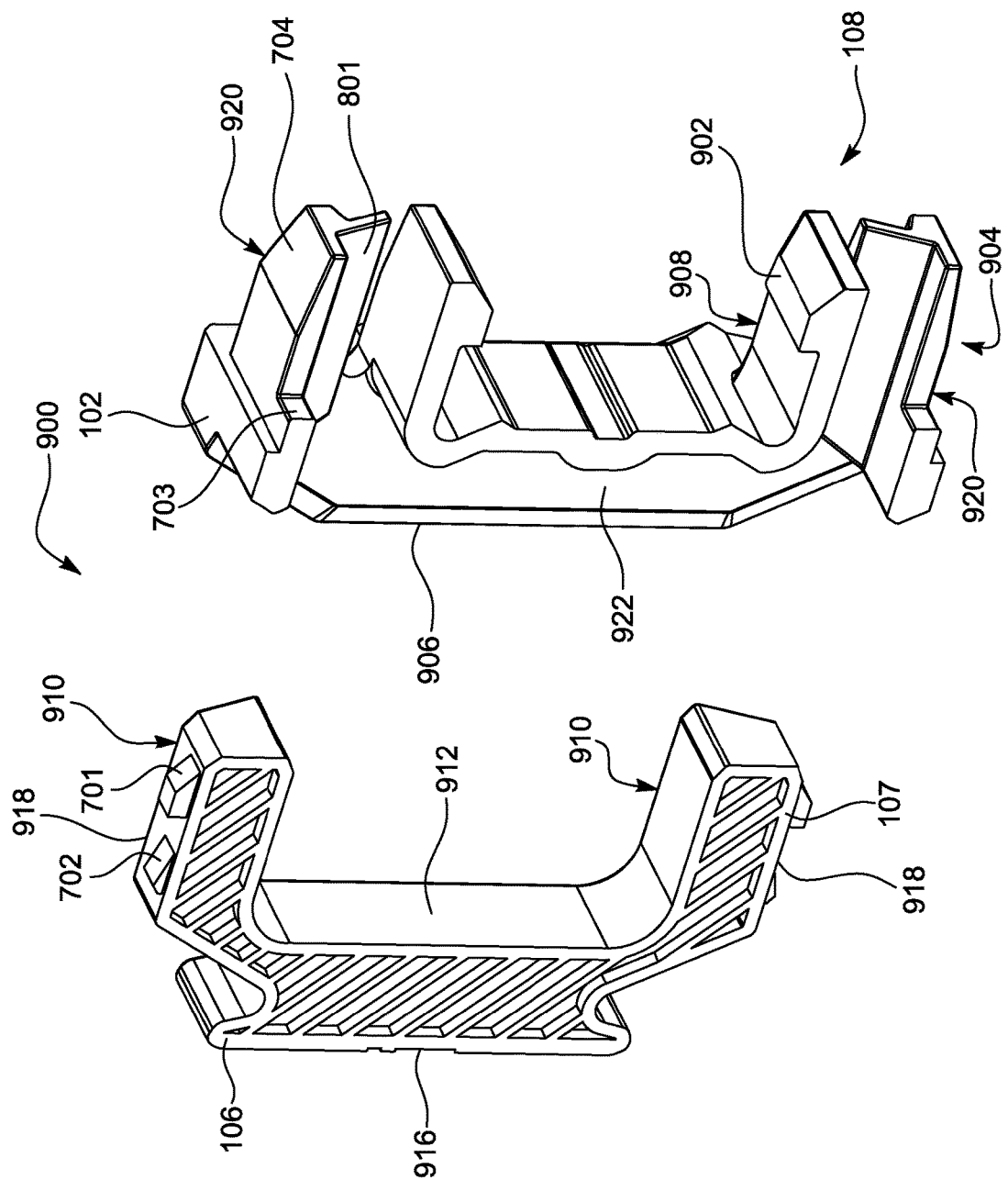
FIG. 9 shows an example of a disassembled level endcap.

FIG. 9 shows an example of a disassembled level endcap. Illustration details an unassembled endcap 900. Illustration further details the elements of the sliding C-clamp 107 and locking hook structure 108 as these structures stand alone when uncoupled. The sliding C-clamp 107 formed in a "C" configuration comprise two end portions 910 and a middle portion 912, a handle 106, an outer side 918 of the end portion 910, an outer side of the middle portion 916, a stop tab 701, and a positioning tab 702. The locking hook structure 108 formed in a "C" configuration comprise two end portions 920, middle portion 922, locking hook structure outer end portions 904, a locking tab 902, inner end portion walls 708, inner middle portion 914, back wall inner surface 801, upper outer side wall 704, 904, locking hook structure outer wall 102, stop wall 703, and an outer middle portion back 906.

FIG. 9 also illustrates sliding C-clamp 107 and locking hook structure 108 separately. Sliding C-clamp 107 has a "C" configuration, comprising two end portions 910 coupled to the ends of the middle portion 912. A handle 106 is formed on the middle portion 912 outer side 916. On each of the outer sides 918 of the end portions 910 there is a stop tab 701 and a positioning tab 702. The positioning tab 702 is located towards the middle portion 912 and the stop tab 701 is positioned towards the free end of the end portion 910.

The locking hook structure 108 has a "C" configuration, comprising two end portions 920 coupled to ends of a middle portion 922. The locking hook structure 108 forms a housing open frame structure where the end portions 920 comprise an inner end portion wall 708, an outer end portion 904, an upper outer side wall 704, 904, a back wall inner surface 801, and an outer wall 102. The end portions 920 form an open frame structure to house the sliding C-clamp 107 end portions 910, allowing the sliding C-clamp 107 end portions 910 to slide within the locking hook structure 108 end portions 920 frames. The upper outer side walls 704, 904 of the end portions 920 have a cut out forming a stop wall 703. The stop wall 703 is substantially vertical and parallel to the locking hook structure 108 middle portion 922. The locking hook structure 108 further has a middle portion 922 comprising a long inner side 914 and an outer middle portion back 906 where the sliding C-clamp 107 middle portion 912 slides back and forth on the locking hook structure 108 outer middle portion back 906. The locking hook structure 108 as part of its inner end portion wall 708 has a locking tab 902. The locking tab 902 locks onto a level end 109 when the endcap 110 is coupled to the level apparatus 101 with the sliding C-clamp 107 in a fully forward position within the locking hook structure 108.

As illustrated in FIG. 9, The back wall 801 is not coupled to or a part of inner end portion wall 708 allowing vertical movement of the inner side wall 708, the inner side wall 708 movement further allowing vertical movement of locking tab 902 when locking coupling or decoupling of the locking tab 902 to/from the level end 109. Vertical movement is movement in parallel with the locking hook structure 108 middle portion 922 and perpendicular to a back-and-forth movement direction 802 of sliding C-clamp 107 as shown in FIG. 8.

In order to assemble an endcap assembly 110, the sliding C-clamp 107 is slidably inserted into and coupled to the locking hook structure 108 housing open frame structure. The end portions 910 of the sliding C-clamp 107 are positioned inside the open frame of the locking hook structure 108 end portions 920. The handle 106 is used to push forward and pull backward the sliding C-clamp 107 within the locking hook structure in a back-and-forth sliding C-clamp movement direction 802. A forward movement of the sliding C-clamp 107 will cause the sliding C-clamp 107 to be in a fully forward position within the locking hook structure 108 and a backward movement of the sliding C-clamp 107 will result in the sliding C-clamp 107 to be in a fully backward position within the locking hook structure 108. The endcap assembly 110 front end 804 is coupled to the level end 109 and the handle 106 located at the rear end 806 of the endcap assembly 110 is used to push and pull of the sliding C-clamp 107 within the locking hook structure 108. With the sliding C-clamp 107 in a fully backward position within the locking hook structure 108 the positioning tab 702 on the end portion 910 of the sliding C-clamp 107 in placed under the locking hook structure 108 end portion 920 outer wall 102, this placement removes the end of the sliding C-clamp 107 end portions 910 from top of the locking hook structure end portion inner walls 708 and allows the locking tabs 902 of the locking hook structure 108 some movement flexibility to move away from each other allowing the locking tabs 902 to engage the level end 109. The configuration of the level end 109, when the locking hook structure 108 is pushed towards the level end 109 may force the end portions 920 of the locking hook structure 108 and the associated locking tab 902 to flex and the locking tabs 902 to engage the level end 109 and finally be locked in place. Alternatively, when the locking hook structure 108 is pulled back the locking tabs 902 may flex to release the level end 109 structure for the endcap assembly 110 to dislodge from the level end 109 and be separated from the level apparatus 101. To couple the endcap assembly 110 with the level apparatus 101, the sliding C-clamp 107 end portions 910 are pushed forward as part of the sliding C-clamp 107 being pushed forward using the handle 106 to place the end of the sliding C-clamp 107 end portions 910 on top of the locking hook structure end portion inner walls 708 locking the locking tabs 902 in place locking the endcap assembly 110 to the level end 109. The general forward movement of the endcap assembly 110 towards the level apparatus 101 to engage the level end 109 and couple the locking hook structure 108 to the level end 109 and further lock the endcap assembly 110 to the level apparatus 101 is carried out through a single linear movement of the handle 106. In order to separate the endcap 100 from the level apparatus 101 after the endcap assembly 110 is locking coupled to the level apparatus 101 is also carried out by a single backward motion of the handle 106, first pulling the sliding C-clamp 107 to a fully backward position allowing the locking tabs 902 to disengage from the level end 109 and with the sliding C-clamp 107 stop tab 701 resting against the locking hook structure 108 stop wall 703 further pulling back of the handle 106 causes the endcap assembly 110 to be pulled back from level apparatus 101 separating the endcap assembly 110 from the level apparatus 101.

In line with the FIG. 9 showing the two parts forming the endcap assembly, in the two-parts endcap embodiment the locking hook housing open frame structure 108 includes the two end portions 920, each with an inner side wall 708, an outer side wall 704, 904 and a back wall 801, with the end portions 920 are coupled to ends of the middle portion 922 which includes one inner side wall 914 and a back wall 906. The outer side wall 704, 904 of each of the end portions 920 of the locking hook structure 108 has a cut out forming a stop wall 703, and the inner side wall 708 of each of the end portions 920 of the locking hook structure has a locking tab 902. The stop wall 703 limits the backward motion of the sliding C-clamp 107 within the locking hook structure 108. The locking tab 902 locks the locking hook structure 108 to an end of a level 101 level apparatus when the locking hook structure 108 is coupled to the level end 109 of the level 101 level apparatus.

Here the back wall 801 is not coupled to or a part of inner end portion wall 708 allowing vertical movement of the inner side wall 708 movement further allowing vertical movement of locking tab 902 when locking coupling or decoupling of the locking tab 902 to/from the level end 109.

In the two-parts endcap embodiment, the sliding C-clamp 107 includes the two end portions 910 coupled to ends of the middle portion 912 of the "C" shaped structure where an outer side 916 of the middle portion 912 forms a handle 106, and where the end portions 910 of the sliding C-clamp 107 have a stop tab 701 and a positioning tab 702 coupled to an outer side 918 of the end portions 910. In this embodiment the sliding C-clamp 107 is slidably positioned inside the locking hook housing open frame structure 108. The sliding C-clamp 107 end portions 910 slide in a linearly back and forth direction 802 within the end portions 920 of the locking hook housing open frame structure 108 through applying a linear force to the handle 106 formed as part of the back of the middle portion 916 of the sliding C-clamp 107.

With a fully forward position of the sliding C-clamp 107 within the locking hook structure 108, the end portions 920 of the locking hook structure 108 are substantially parallel and at a substantially vertical angle with respect to the middle portion 922 of the locking hook structure 108. Furthermore at a fully backward position of the sliding C-clamp 107 within the locking hook structure 108, a stopping tab 701 on an outer side 918 of the end portions 910 of the sliding C-clamp 107 rest against a stop wall 703 of a cut out of an outer side walls 704, 904 of the locking hook structure end portions 920, and a positioning tab 702 on the outer side 918 of the end portions 910 of the sliding C-clamp 107 is positioned under the outer side walls 102 of the locking hook structure 108 end portions 920, flexing the end portions 920 of the locking hook structure housing frames away from each other from their substantially parallel configuration at a fully forward position of the sliding C-clamp 107 within the locking hook structure 108.

With the fully backward position of the sliding C-clamp 107 within the locking hook structure, with the sliding C-clamp 107 stop tab 701 resting against the locking hook structure 108 stop wall 703, any further backward force on the handle 106 formed as part of the sliding C-clamp 107 middle portion 912 will move both the sliding C-clamp 107 and the locking hook structure backward as a two-parts endcap assembly 110.

The present disclosure shows the locking tabs 902 facing each other as part of the front end 804 of the endcap assembly 110 locking hook structure 108 to accommodate the presented configuration of the level end 109 of the level apparatus 101. Alternative embodiments of level ends and accommodating endcaps may require the locking tabs 902 to be facing away from each other or face sideways. Furthermore, the locking and unlocking mechanism of moving the sliding C-clamp 107 in a forward and backward direction 802 within the locking hook structure 108 may be replaced by a pin structure going through the locking hook structure 108 end portion 920 walls locking the locking tabs 902 or another locking mechanism in place. In another possible embodiment a toggle locking tab (not shown) may be used at the end of the endcap assembly 110 locking hook structure 108 to lock the endcap assembly 110 to the level apparatus 101 with an accommodating corresponding level end. In a further possible embodiment, the single linear straight back and forth movement 802 of the sliding C-clamp 107 within the locking hook structure 108 to couple and uncouple the endcap assembly 110 with/from the level end 109 may be accomplished through a curved movement of the endcap assembly 110 with an alternative locking tab 902 configuration and an accommodating level end 109 configuration using a moment arm force instead of a linear force.

It will be understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A level endcap, comprising:
  a two-part endcap assembly, including a locking hook structure and a sliding C-clamp, removably coupled and locked to an end of a level apparatus; and
  wherein the sliding C-clamp, slidably and inseparably coupled inside the locking hook structure, unlocks and separates the endcap from the level apparatus through a single sliding movement.

2. The level endcap of claim 1, wherein the single sliding movement is a straight linear movement.

3. The level endcap of claim 1, wherein the locking hook structure forms an open frame channel structure shaped in a "C" configuration,
  wherein the "C" configuration channel structure has two end portions, each with an inner side wall, an outer side wall and a back wall coupled to ends of a middle portion with one inner side wall and a back wall,
  wherein the outer side wall of each of the end portions has a cut out forming a stop wall, and
  wherein the inner side wall of each end portion has a locking tab to couple to a level end.

4. The level endcap of claim 1, wherein the sliding C-clamp is a solid structure formed in a "C" configuration with two end portions coupled to a middle portion,
  wherein an outer side of the middle portion forms a handle, and
  wherein the sliding C-clamp is slidably positioned inside the locking hook structure open frame channel with the end portions of the sliding C-clamp slidably moving through the end portion open frame channels of the locking hook structure and the middle portion of the sliding C-clamp sliding against the locking hook structure middle portion back wall.

5. The sliding C-clamp of claim 4, wherein the end portions of the sliding C-clamp have a stop tab and a positioning tab coupled to an outer side of the end portions.

6. A two-part endcap of a level, the two-part endcap comprising:
  a "C" shaped locking hook structure and a "C" shaped sliding C-clamp,
  wherein the "C" shape includes two end portions coupled to a middle portion for each one of the locking hook structure and the sliding C-clamp; and
  wherein the end portions of the sliding C-clamp, are slidably and inseparably coupled inside the locking hook structure, which when moved linearly within the end portions of the locking hook structure flex the end portions of the locking hook structure substantially perpendicularly to the linear movement direction of the sliding C-clamp to attach or separate the two-part endcap from the level.

7. The two-parts endcap of claim 6, wherein the locking hook housing open frame structure comprise the two end portions, each with an inner side wall, an outer side wall and a back wall, with the end portions coupled to ends of the middle portion, with the middle portion comprising one inner side wall and a back wall,
  wherein the outer side wall of each of the end portions has a cut out forming a stop wall, and
  wherein the inner side wall of each end portion has a locking tab.

8. The two-parts endcap of claim 6, wherein the sliding C-clamp comprise the two end portions coupled to ends of the middle portion,
  wherein an outer side of the middle portion forms a handle, and
  wherein the end portions of the sliding C-clamp have a stop tab and a positioning tab coupled to an outer side of the end portions.

9. The two-parts endcap of claim 6, wherein the sliding C-clamp is slidably positioned inside the locking hook housing open frame structure,
  wherein the sliding C-clamp end portions slide linearly back and forth within the end portions of the locking hook housing open frame structure through applying a linear force to a handle formed as part of a back of the middle portion of the sliding C-clamp,
  wherein at a fully forward position of the sliding C-clamp within the locking hook structure, the end portions of the locking hook structure are substantially parallel and at a substantially vertical angle with respect to the middle portion of the locking hook structure, wherein at fully backward position of the sliding C-clamp within the locking hook structure, a stopping tab on an outer side of the end portions of the sliding C-clamp rests against a stop wall of a cut out of an outer side walls of the locking hook structure end portions, and a positioning tab on the outer side of the end portions of the sliding C-clamp is positioned under the outer side walls of the locking hook structure end portions, flexing the end portions of the locking hook structure housing frames away from each other from their substantially parallel configuration at a fully forward position of the sliding C-clamp within the locking hook structure, and wherein a free end of the end portions of the sliding C-clamp are not on top of a locking hook structure end portions inner side walls, allowing a free end of the end portions inner side walls, wherein a locking tab is positioned freedom to move and flex upward and downward.

10. The two-parts endcap of claim 9, wherein at the fully backward position of the sliding C-clamp within the locking hook structure, with the sliding C-clamp stop tab resting against the locking hook structure stop wall, any further backward force on a handle formed as part of the sliding C-clamp middle portion will move both the sliding C-clamp and the locking hook structure backward as a two-parts endcap assembly.

11. A method of using a level endcap, comprising:
using a two-part endcap assembly comprising a "C" shaped sliding C-clamp with two end portions coupled to a middle portion, slidably and inseparably housed in a "C" shaped locking hook housing open frame structure with two end portions coupled to a middle portion,
wherein pulling the sliding C-clamp backwards within the locking hook housing open frame structure to separate the two-part endcap assembly from the level, causes the end portions of the locking hook structure to be angularly pushed away from each other from a parallel configuration,
coupling the endcap assembly locking hook structure to an end of a level, and sliding the sliding C-clamp forward inside the locking hook structure, relaxing the end portions of the locking hook structure into a substantially parallel angular configuration, locking the endcap assembly to the level end using a locking tab on an inner side wall of the end portions of the locking hook structure.

12. The method of using the level endcap of claim 11, wherein to remove the endcap assembly from the level apparatus, the end cap is unlocked from the level end by sliding the sliding C-clamp backward within the locking hook structure flexing the locking hook structure end portions away from each other from an angular parallel configuration, releasing the locking tabs of the locking hook structure from the level end,
further pulling back the sliding C-clamp, which is positioned within the locking hook structure, and
moving the endcap assembly away from the level end.

13. The method of using the level endcap of claim 11, wherein assembling the endcap comprise:
slidably positioning the sliding C-clamp within the locking hook housing open frame structure.

14. The method of using the level endcap of claim 13, with the locking hook housing open frame structure end portions further comprising an inner side wall, an outer side wall and a back wall,
with the outer side wall further comprising a cutout providing a stop wall, and
with the middle portion comprising an inner side wall and a back wall.

15. The method of using the level endcap of claim 13, with the "C" shaped sliding C-clamp end portions further comprising a stop tab and a positioning tab on an outer side of the end portions.

16. The method of using the level endcap of claim 13, with the end portions of the sliding C-clamp sliding within the end portions of the locking hook housing open frame structure, and the middle portion of the sliding C-clamp sliding against the middle portion back wall of the locking hook housing open frame structure.

17. The method of using the level endcap of claim 13, wherein the sliding C-clamp in a fully forward position within the locking hook housing open frame structure provides the angular parallel positioning of the locking hook housing open frame structure end portions,
with the sliding C-clamp in a fully backward position within the locking hook housing open frame structure, positioning the positioning tab of the sliding C-clamp under the outer side wall of the locking hook housing open frame structure pushing the locking hook housing open frame structure end portions away from each other in an angular non-parallel configuration with the sliding C-clamp stop tab resting against the stop wall of the locking hook housing open frame structure end portion outer wall cut out, and
wherein a free end of the end portions of the sliding C-clamp are not on top of a locking hook structure end portions inner side walls, allowing a free end of the end portions inner side walls wherein a locking tab is positioned freedom to move and flex upward and downward.

18. The method of using the level endcap of claim 13, using a handle formed from a back of the sliding C-clamp middle portion to push the sliding C-clamp to slide forward within the locking hook housing open frame structure,
further using the handle to pull backward the sliding C-clamp to slide the sliding C-clamp backward within the locking hook housing open frame structure, and
with the sliding C-clamp stop tab against the stop wall of the locking hook housing open frame structure end portion outer wall cut out in a fully backward position, causing the endcap assembly to be pulled back with further pulling of the sliding C-clamp middle portion handle.

19. The method of using the level endcap of claim 13, with the pulling of the sliding C-clamp middle portion handle and backward sliding of the sliding C-clamp within the locking hook housing open frame structure, disengaging the locking tab on the inner side wall of the end portions of the locking hook open frame structure from the level apparatus,
further pulling backward of the sliding C-clamp middle portion handle from the fully backward position of the sliding C-clamp within the locking hook housing open frame structure causing the endcap assembly moving backward away from the level apparatus, and
wherein the backward movement of the sliding C-clamp middle portion handle is a single linear movement causing disengagement of the locked locking hook structure from the level apparatus and separating the endcap from the level apparatus.

20. The method of using the level endcap of claim 13, wherein the locking of the endcap onto the level apparatus, with the end cap sliding C-clamp in a fully backward position within the locking hook housing frame structure starts with a single forward movement of the endcap against an end of the level apparatus;
- further pushing the endcap against the level apparatus, causing the locking hook housing open frame structure end portions locking tabs engaging the level end, coupling the endcap to the level end in a locking manner; and
- further removing the endcap from the level end comprising a single backward movement of the endcap from the end of the level apparatus by pulling the sliding C-clamp middle portion handle away from the level apparatus until the sliding C-clamp end portion stop tab reaches and rests against the stop wall of the locking hook structure open frame end portion, wherein continued backward pull disengages the endcap from the level apparatus and removes the endcap from the level end.

* * * * *